United States Patent [19]

Hager et al.

[11] 4,261,389

[45] Apr. 14, 1981

[54] GAS INJECTING VALVE FOR SUSPENSIONS

[75] Inventors: Claus Hager, Julbach; Rudolf Wiedholz; Jurgen Schmidt, both of Burghausen, all of Fed. Rep. of Germany

[73] Assignee: Wacker-Chemie GmbH, Munich, Fed. Rep. of Germany

[21] Appl. No.: 90,594

[22] Filed: Nov. 2, 1979

[30] Foreign Application Priority Data

Dec. 5, 1978 [DE] Fed. Rep. of Germany ....... 2852536
Aug. 10, 1979 [DE] Fed. Rep. of Germany ....... 2932578

[51] Int. Cl.$^3$ .............................................. F16K 1/52
[52] U.S. Cl. ............................ 137/625.38; 251/144; 251/332
[58] Field of Search .................. 137/625.38, 625.3; 251/144, 332

[56] References Cited

U.S. PATENT DOCUMENTS

| 3,821,968 | 7/1974 | Barb | 137/625.3 |
| 3,949,963 | 4/1976 | Aoki | 251/144 X |

FOREIGN PATENT DOCUMENTS 22096 of 1914 United Kingdom ................ 137/625.38

*Primary Examiner*—Arnold Rosenthal
*Attorney, Agent, or Firm*—Burgess, Ryan and Wayne

[57] ABSTRACT

A valve arrangement for injecting a gas into a polyvinyl chloride fluid suspension, through an inlet port in the bottom of the suspension tank. The valve includes an overhanging upper disk with a hollow foraminated cylinder, so that the gas exits the cylinder under pressure through the foraminations, thus keeping the operating portion of the valve free of the suspension, with the valve disk overhang providing additional protection against intrusion of suspension material into the clearance space between the valve cylinder and surrounding injection tube. The valve disk overhang terminates in a pointed ridge which engages the top of the injection tube to form a seal.

2 Claims, 4 Drawing Figures

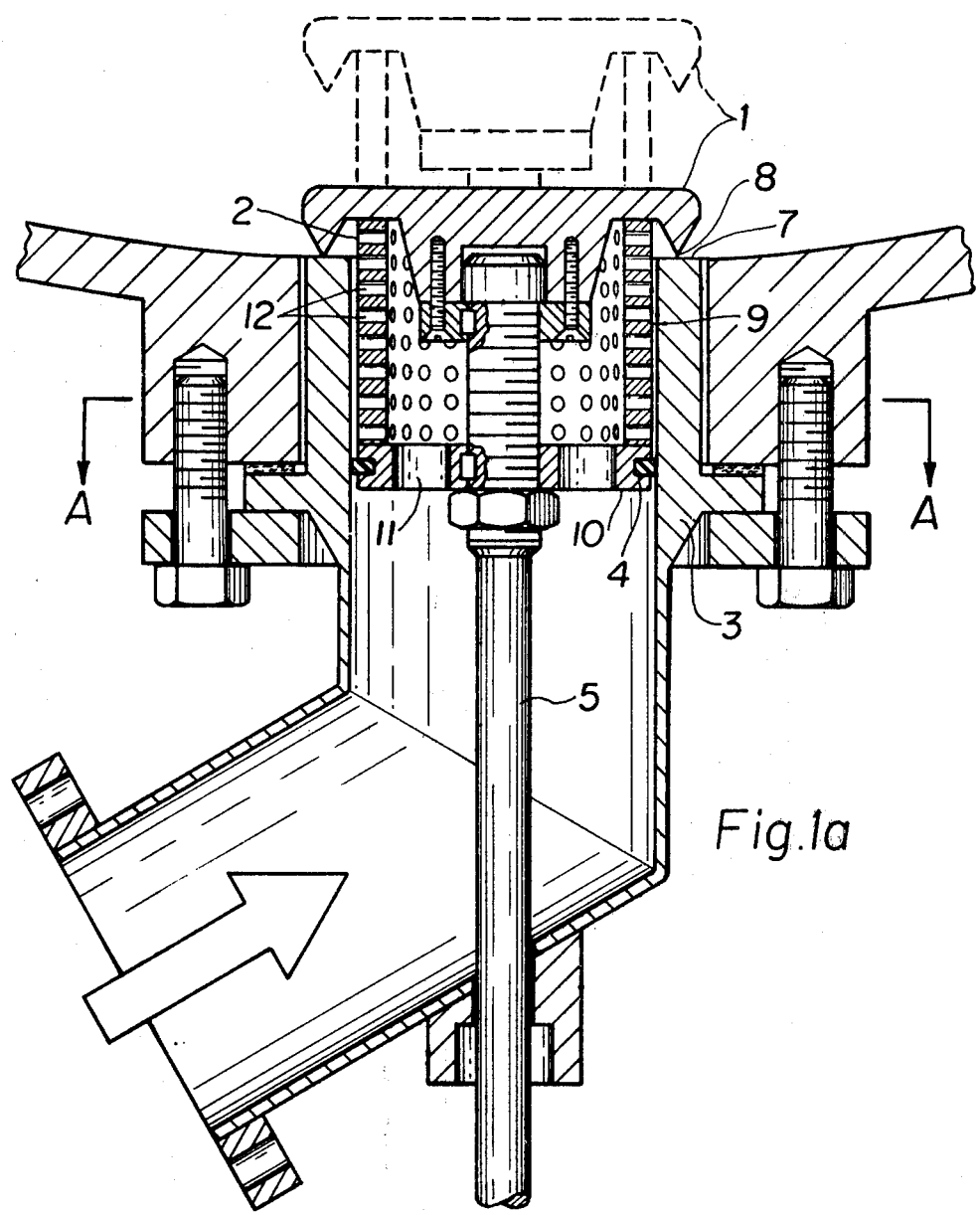
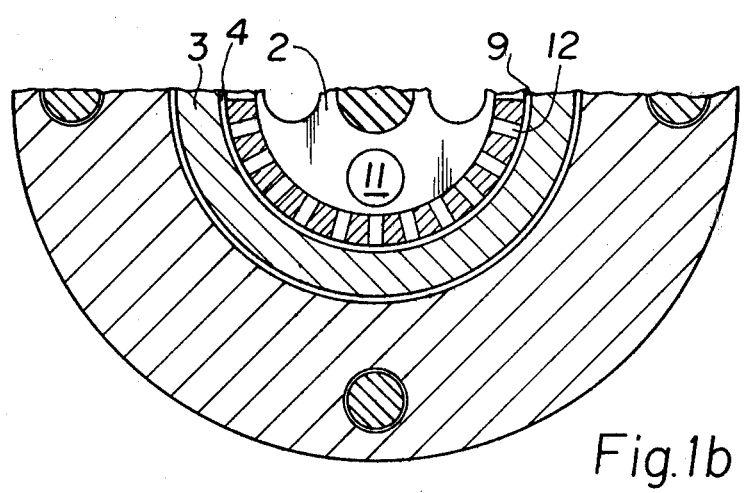

GAS INJECTING VALVE FOR SUSPENSIONS

This invention relates to a valve arrangement for injecting a gas into a fluid suspension from the bottom of the suspension container.

To charge polyvinyl chloride ("PVC") suspensions with gas, gas or water vapor is usually injected from below into the degasifying container through a bottom valve that must close as evenly as possible with the inner face of the container. As a rule these degasifying operations are a batch process, so that the gas-injecting valve must again be closed in the filled container. For reasons of cleanliness, the penetration of solids into the gas pipe and the valve must be eliminated during the injection process and especially during the closing operation.

An object of the present invention is to provide an injection valve that has no "dead" spaces, that is easy to regulate, that uniformly and evenly distributes the incoming gas current, and that prevents flow back into the gas pipe.

The injection tube 3 is generally a cylindrical tube that is spaced from the exhaust port a distance from 2 to 10 times the diameter of said tube and bent to form an angle of from 30° to 90°. The valve hollow piston is moved in the injection tube by means of a threaded spindle. The valve disk has an annular cutting edge oriented in the direction of the injection tube. The annular cutting edge acts as a single sealing element against the flatly cut front face of the injection tube when the valve is closed. Thus, when the valve is open, the gas flows from the injection tube through the valve hollow piston and the bores arranged in the container on the curved cylindrical face. The bores in the curved cylinder face can be arranged and dimensioned so that the amount of gas can be regulated proportionally to the stroke. In the case of precise fine regulation, the bores are preferably made small, the vertical spacing between the individual bores preferably amounting to 1.5 to 3 times the bore diameter. The bores can be arranged on the periphery both in annular and spiral form.

IN THE DRAWING

FIG. 1a is a cross-sectional view of a gas injecting valve according to a preferred embodiment of the invention;

FIG. 1b is a partial cross-sectional view of the arrangement of FIG. 1a, taken along the cutting plane A—A;

Figure 2A:
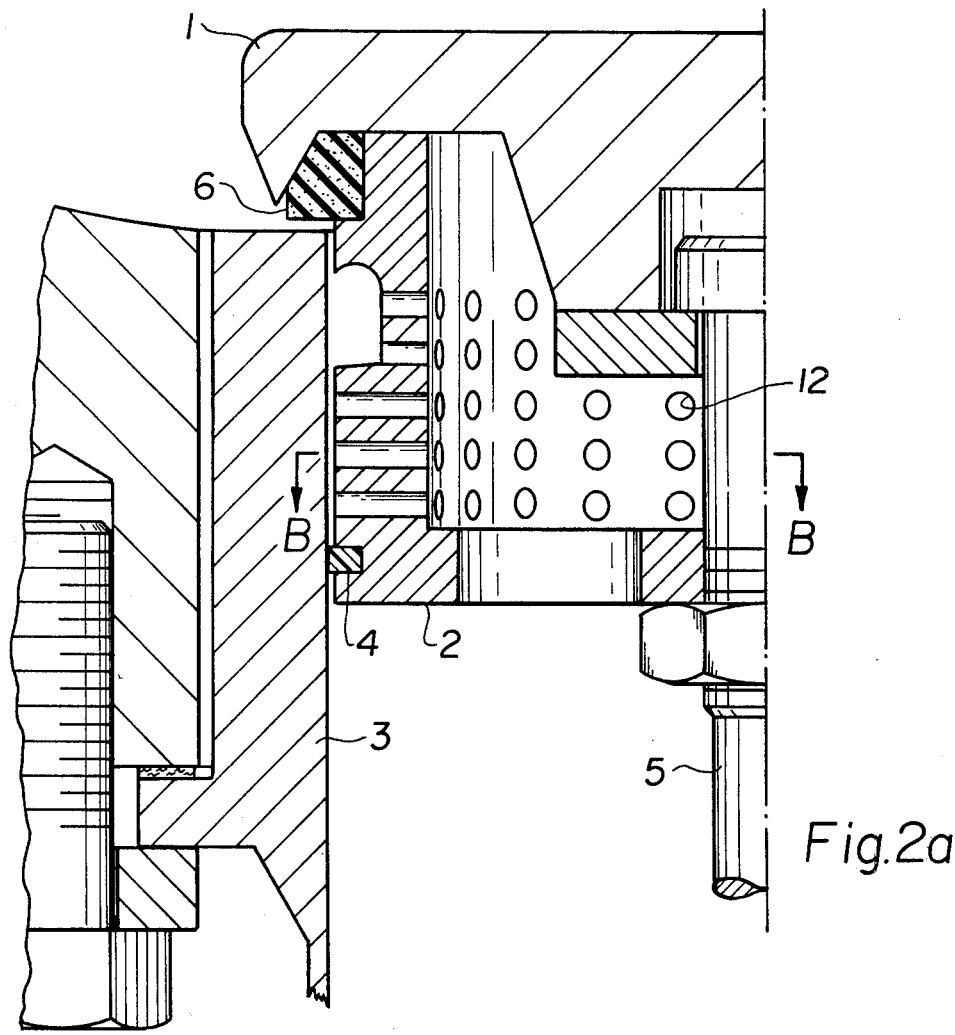
FIG. 2a is a partial cross-sectional view of a gas-injecting valve according to an alternative embodiment of the invention.

A gas-injecting valve for suspensions according to a preferred embodiment of the invention has the following features:

1. An injection tube 3 perpendicular to the inner face of the tank and spaced from the exhaust port thereof (not shown) a distance on the order of 2 to 10 times the diameter of the tube 3, with a 30° to 90° bend;

2. A hollow piston 2 movable in the injection tube 3 by means of a threaded spindle 5, said piston being pressed on the gas intake side opposite the injecting tube 3 into a soft material seal 4;

3. The hollow piston 2 on the exhaust side is closed by a disk 1 that has an annular cutting edge 8 that acts as a seal against the front face 7 of the injecting tube 3; and 4. The curved cylinder face 9 has multiple perforations and the flat cylinder face 10 has bores 11 on the gas intake side.

The gas-injecting valve according to the invention eliminates the back flow of the product in the gas pipe or injecting means, finely distributes and branches the gas current so that no oscillations of condensation occur. The valve is easily regulatable. The seal between the suspension container and the valve is purely metallic. The valve closes without dead spaces.

The movable sealing element 4 of the gas-injecting valve is substantially a valve disk that is firmly connected to a hollow cylinder, which is passed into the injection tube. The annular or throttle gap between the hollow cylinder 9 and the gas-injection tube 3 generally amounts to 0.05 to 0.3 mm, preferably 0.1 mm. The cylinder is passed through a soft material ring that remains effective even when the valve is fully open. The soft material ring has no sealing function. The hollow cylinder is perforated with bores 12 that are either cylindrical or conical and are thus self-cleaning. To increase the sliding capacity, the hollow cylinder, constructed as a nozzle ring, can be surrounded, for instance, with a Teflon shrinking hose bored out on the nozzle openings.

Experience has shown that the valve according to the invention is particularly well suited to degasify PVC suspensions. Temperature-sensitive parts such as rubber seals or the like are not exposed to the direct vapor radiation when vapor is used to charge PVC suspensions with gas. In the easily opened valve disk, vapor already flows over the uppermost rows of bores and the throttle gap into the hollow space that the valve cutting edge encloses with the sealing face and from there, via the annular gap that has become exposed, into the suspension that thus cannot easily penetrate in the valve. When the valve is open, the vapor that leaves the throttle gap that exists between the injection tube and the movable piston prevents a back flow of the suspension, and upon closing blows out any PVC material that may have eventually penetrated into the gap. Even when the valve is fully open, nozzle bores must still discharge in said throttle gap to ensure this effect. The high velocity of flow in the nozzle bores ensures that no liquid whatever can press back from the container into the valve.

Another embodiment comprises having axially extending slots instead of nozzle bores in the movable hollow piston. The axially extending slots can be tapered to achieve a controlling action.

In another preferred embodiment, the above described valve, as shown for example in FIG. 1, is modified in the sense that between disk 1 and the front face of the injecting tube 3 there is additionally arranged at least one soft material (e.g. sponge rubber) and/or soft metal throttle ring 6 on the disk 1 and/or on the front face of the injection tube 3 in a manner such that it is situated, when the valve is closed, in the space between the seal formed by the cutting edge of the disk 1 and the front side of the injection tube 3 and the hollow pistion 2 and has a thickness in the direction of movement of the hollow piston 2 such that the cutting edge of the disk 1, when the valve is closed, is compressed with 50 to 80% of the total closing force against the sealing face of the injection tube 3 and accordingly 20 to 50% of said total closing force is absorbed by the throttle ring 6.

Figure 2B:
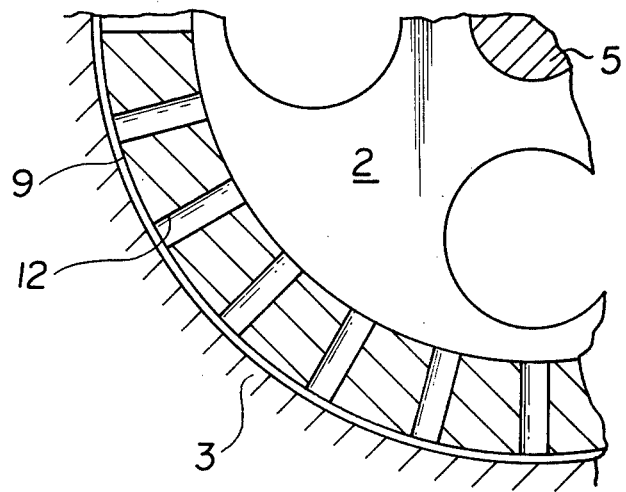
FIG. 2b is a partial cross-sectional view of the arrangement of FIG. 2a, taken along the cutting plane B—B.

The construction of the preferred embodiment shown in FIG. 2 differs from the construction of the gas-injecting valve shown, for instance, in FIG. 1 only by the soft material and/or soft metal throttle ring(s) 6 that can be secured to the disk 1 between the cutting edge of the disk 1 and the hollow piston 2, and/or mounted on the portion of the front face of the injecting tube 3 between the sealing ring formed by the cutting edge of the disk 1 and said front face and the edge formed by the inner side and said front face of the injection tube 3.

If so desired, parts of the throttle ring can be embedded in the portion where it is secured or mounted According to the invention, there can be used as soft material or soft metal throttle rings, materials that in comparison to the materials of which the rest of the valve consists, especially those of the disk 1 and of the injection tube 3, are not as hard, provided they have the temperature stability necessary for the respective use. Suitable throttle ring materials are rings of foamed plastic materials, in particular copolymers of ethylene and fluoro-hydrocarbon polymers, preferably ethylene-propylene copolymer or polytetrafluoroethylene (PTFE), rings of mineral fibers (for example, asbestos) or textile fibers that can also be impregnated or coated with the above-mentioned plastic materials. In addition, it is possible to use soft metal rings, for example, of aluminum, tin, lead, iron, copper, silver, gold, alloys of said metals, for example, with zinc, magnesium or mercury. Plastic rings are generally preferred because of their greater elasticity.

The mode of operation of the throttle ring(s) can be described as follows without any limitation of the mode of operation being hereby intended.

When the valve is closed, the cutting edge of the disk 1 and the flatly cut front face of the injection tube 3 act in general as the only sealing element. Seen in the direction of the flow of the injected gas or water vapor, at least one soft material or soft metal ring is encountered before the sealing cutting edge, said ring serving as a throttle zone, thus making possible a precise adjustment of the shutting force required.

By positioning the throttle ring between the sealing element and the hollow piston, a "nozzle effect" is obtained when the valve closes, wherein the valve is extensively blown free of dispersion portions.

What is claimed is:

1. A gas-injecting valve for injecting as gas into a suspension contained in a tank, said tank having a bottom wall and inlet and exhaust ports, said inlet port being disposed in said bottom wall, said valve comprising:
   an injecting tube having a 30° to 90° bend therein, with a portion of said tube being disposed in said inlet port, perpendicular to the inner face of the tank, said tube portion being spaced from said exhaust port by a distance in the range of 2 to 10 times the diameter of said tube;
   a hollow piston disposed in said injection tube portion and movable in a direction perpendicular to said tank inner face, said piston having a curved cylinder wall with multiple perforations therethrough, and a flat cylinder face having bores communicating the interior of the piston with the other section of the injecting tube;
   a threaded spindle for moving said piston;
   an annular seal of soft material disposed between a peripheral section of said cylinder wall and the adjacent interior wall of said injecting tube; and
   a disk covering the end of said piston adjacent said tank and overhanging said cylinder face, said disk having an annular cutting ridge for engaging the end of the injection tube adjacent the inner face of the tank.

2. A gas injecting valve according to claim 1, wherein between the disk and the front face of the injection tube there is arranged at least one relatively soft material throttle ring on the disk and/or on the front face of the injection tube, so that when the valve is closed, the ring is situated in the space between the seal formed by the cutting edge of the disk and the front side of the injection tube and the hollow piston, and the ring has a thickness in the direction of movement of the hollow piston such that when the valve is closed, the cutting edge of the disk is compressed with 50 to 80% of the total shutting force on the sealing face of the injection tube, whereby a substantial portion of said total shutting force is absorbed by the throttle ring.

* * * * *